(12) United States Patent
Jayaraman et al.

(10) Patent No.: US 10,942,725 B2
(45) Date of Patent: Mar. 9, 2021

(54) OVER THE AIR ECU UPDATE

(71) Applicant: Ford Global Technologies, LLC, Dearborn, MI (US)

(72) Inventors: Vijay Jayaraman, Novi, MI (US); Jason Michael Miller, Woodhaven, MI (US); Mohamad Nasser, Dearborn Heights, MI (US); Ali Mohamad Suleiman, Dearborn, MI (US); Karl Nathan Clark, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 16/048,932

(22) Filed: Jul. 30, 2018

(65) Prior Publication Data
US 2020/0034134 A1  Jan. 30, 2020

(51) Int. Cl.
  *G06F 9/44* (2018.01)
  *G06F 8/65* (2018.01)
  *H04L 29/06* (2006.01)
  *H04L 29/08* (2006.01)

(52) U.S. Cl.
  CPC ........... *G06F 8/65* (2013.01); *H04L 67/02* (2013.01); *H04L 67/34* (2013.01); *H04L 69/04* (2013.01)

(58) Field of Classification Search
  CPC . G06F 8/65; H04L 67/02; H04L 67/36; H04L 69/04
  See application file for complete search history.

(56) References Cited

U.S. PATENT DOCUMENTS

| | | | |
|---|---|---|---|
| 9,720,680 B2* | 8/2017 | Diedrich | H04L 67/34 |
| 2007/0245083 A1* | 10/2007 | Margolus | G06F 11/1096 711/114 |
| 2009/0007254 A1* | 1/2009 | Aoki | H04L 29/12009 726/14 |
| 2009/0116463 A1* | 5/2009 | Hirano | H04W 8/26 370/338 |
| 2010/0177707 A1* | 7/2010 | Essinger | H04W 52/241 370/329 |
| 2011/0023093 A1* | 1/2011 | Small | H04L 29/12283 726/4 |
| 2011/0258391 A1* | 10/2011 | Atkisson | G06F 11/108 711/118 |
| 2012/0311184 A1* | 12/2012 | Yamada | H04L 61/2038 709/245 |

(Continued)

OTHER PUBLICATIONS

Title: Secup: Secure and efficient wireless software updates for vehicles; author: M Steger, et al, published on 2016.*

(Continued)

*Primary Examiner* — Chameli Das
(74) *Attorney, Agent, or Firm* — Brooks Kushman PC; Michael Spenner

(57) ABSTRACT

A system comprises a processor programmed to send an address range to a server corresponding to a capability of a controller to perform an update; responsive to receiving update data from the server, write the update data into the controller; and responsive to receiving a resume signal to resume the update from a paused state, send a new address range to the server based on a last-successfully-written address received from the controller.

11 Claims, 3 Drawing Sheets

(56) References Cited

U.S. PATENT DOCUMENTS

| | | | |
|---|---|---|---|
| 2013/0223447 A1* | 8/2013 | Kahng | H04L 61/609 370/392 |
| 2014/0136414 A1* | 5/2014 | Abhyanker | G05D 1/024 705/44 |
| 2016/0188240 A1* | 6/2016 | Ouyang | G06F 11/1451 711/126 |
| 2016/0292623 A1* | 10/2016 | Wang | G09G 3/3648 |
| 2016/0370192 A1* | 12/2016 | Maischberger | G01C 21/32 |
| 2017/0019758 A1* | 1/2017 | Tawara | H04W 4/08 |
| 2017/0060480 A1* | 3/2017 | Gray | G06F 9/526 |
| 2017/0085417 A1* | 3/2017 | O'Reirdan | H04W 24/04 |
| 2017/0092018 A1 | 3/2017 | Throop et al. | |
| 2018/0017407 A1* | 1/2018 | Dousse | G01C 21/3682 |
| 2018/0018160 A1* | 1/2018 | Teraoka | B60R 16/02 |
| 2018/0157437 A1* | 6/2018 | Sandberg | G06F 12/1027 |
| 2019/0079862 A1* | 3/2019 | Baptist | G06F 12/0284 |
| 2019/0137287 A1* | 5/2019 | Pazhayampallil | H04W 4/40 |
| 2019/0258467 A1* | 8/2019 | Frantz | G06F 8/65 |

OTHER PUBLICATIONS

Title: AiroDag, A sophisticated tool that diagnoses and updates vehicles software over air, author: K Mansour, Published on 2012, source: IEEE.*

Title: An efficient and secure automotive wireless software update framework, author: M Steger, Published on 2017, source: IEEE.*

* cited by examiner

OVER THE AIR ECU UPDATE

TECHNICAL FIELD

The present disclosure generally relates to a method and system for updating a vehicle electronic control unit (ECU). More specifically, the present disclosure relates to updating a vehicle ECU using on-the-fly compression with pause and resume capability.

BACKGROUND

Modern vehicles are equipped with various ECUs operated by software/applications. To keep the software up to date, over the air update are often performed on those ECUs. Using a telematics control unit (TCU) and a wirelessly connected device (such as a cell phone) or on-board modem, a vehicle can access a variety of data that is stored remotely from the vehicle. In some cases, an in-vehicle network connects the ECUs to a variety of vehicle modules, allowing cross communication between various modules and ECUs.

SUMMARY

In one or more illustrative embodiment, a system comprises a processor programmed to send an address range to a server corresponding to a capability of a controller to perform an update; responsive to receiving update data from the server, write the update data into the controller; and responsive to receiving a resume signal to resume the update from a paused state, send a new address range to the server based on a last-successfully-written address received from the controller.

In one or more illustrative embodiment, a method comprises sending a HTTPS address range to a server calculated based on updating capability of an ECU; receiving compressed data from the server; writing update data obtained from the compressed data to the ECU in sections; revising the HTTPS address range using the last-successfully-written address of a section from the ECU; and resuming to write update at the last-successfully-written byte address.

In one or more illustrative embodiment, a server comprises a processor, programmed to responsive to receiving a first HTTPS address range from a vehicle, create a compression window to perform on-the-fly compression on ECU update data to send to the vehicle, and responsive to receiving a second HTTPS address range from the vehicle, move the compression window based on the second HTTPS address range.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a system and method for updating vehicle ECUs using on-the-fly (OTF) compression technology. The system may pause and resume the update process from the last-successfully-written byte address from the target ECU and calculate new HTTPS range based on the address.

Figure 1:
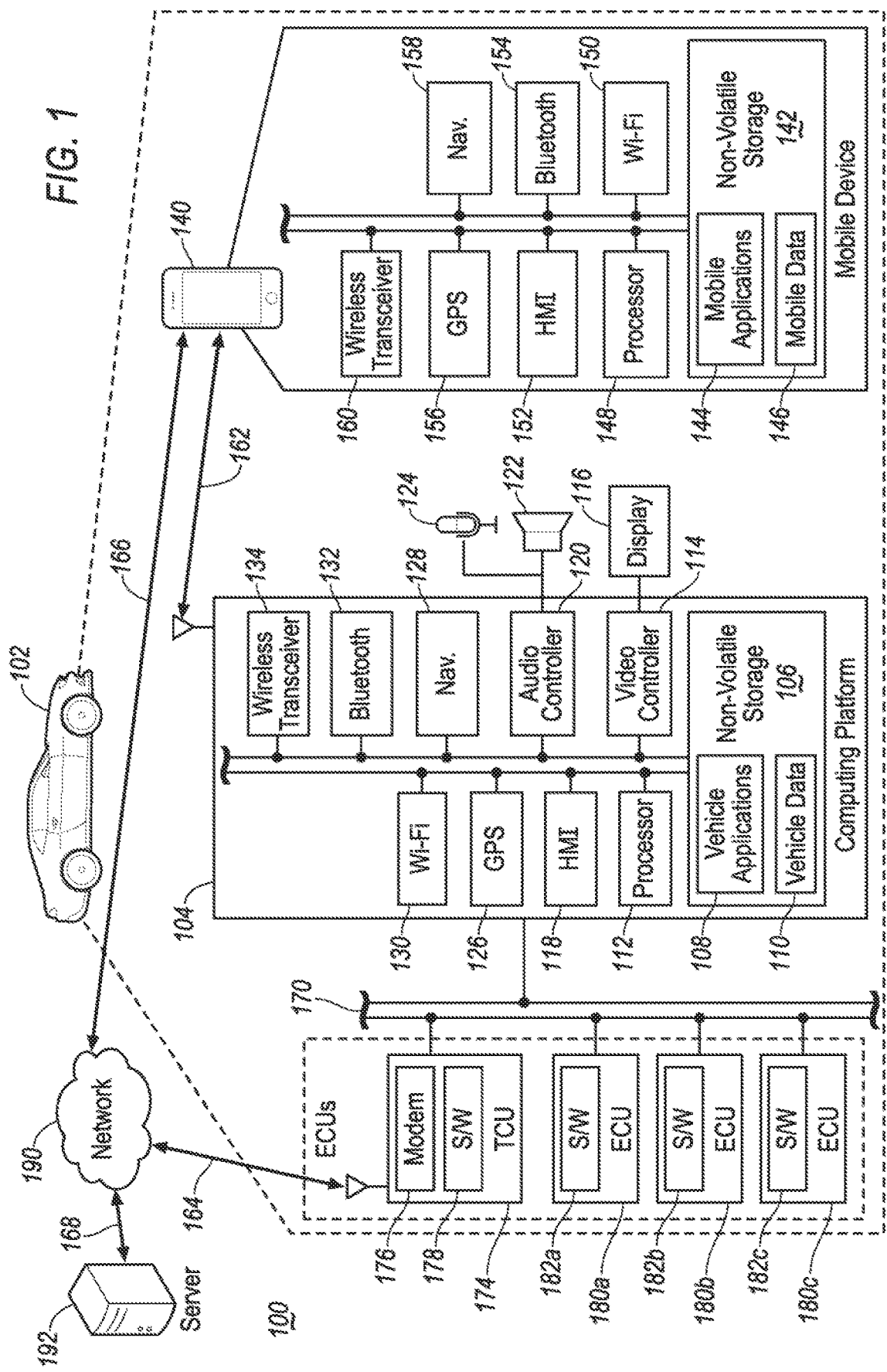
FIG. 1 illustrates an example block topology of a vehicle system of one embodiment of the present disclosure.

Referring to FIG. 1, an example block topology of a vehicle system 100 of one embodiment of the present disclosure is illustrated. Vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and vehicle setting adjustments. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 and microphones 124 configured to provide audio output and input to and from vehicle occupants by way of an audio controller 120. The speaker 122 and microphone 124 may enable various features such as voice command input and audio output from/to the vehicle users.

The computing platform 104 may also be provided with navigation and route planning features through a navigation controller 128 configured to calculate navigation routes responsive to user input via e.g. the HMI controls 118, and output planned routes and instructions via the speaker 122 and the display 116. Location data that is needed for navigation may be collected from a global positioning system (GPS) controller 126 configured to communicate with GPS satellites and calculate the location of the vehicle 102. Map data used for route planning may be stored in the storage 106 as a part of the vehicle data 110. Alternatively, map data may be live streamed from the cloud with or without being stored in the storage 106. As an example, map data used by the computing platform 104 may include not only conventional information such as streets and terrain, but also advance information such as traffic data and coverage condition of wireless networks the computing platform 104 is subscribed to. Navigation software may be stored in the storage 116 as a part of the vehicle applications 108.

The computing platform 104 may be configured to communicate with a mobile device 140 of the vehicle occupants via a wireless connection 162. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 134 in communication with a WiFi controller 130, a Bluetooth controller 132, and other controllers such as a Zigbee transceiver, an IrDA transceiver, an RFID transceiver (not shown), configured to communicate with a compatible wireless transceiver 160 of the mobile device 140.

The mobile device 140 may be provided with communication capability via the wireless transceiver 160 in communication with a WiFi controller 150, a Bluetooth controller 154 and other controllers configured to communicate with a compatible wireless transceiver 134 of the computing platform 104. The mobile device 140 may be further provided with capability to communicate with the wireless network 190 via a wireless connection 166.

The mobile device 140 may be provided with a processor 148 configured to perform instructions, commands, and other routines in support of the processes such as navigation, calling, wireless communication, and multi-media processing. For instance, the mobile device 140 may be provided with location and navigation functions via a navigation controller 158 and a GPS controller 156 controlled by application as a part of a mobile application 144 stored in a non-volatile storage 142. Map data used for navigation purposes may be stored in the storage 142 as a part of mobile data 146. Alternatively, the mobile device 140 may be configured to download live map and traffic data from a remote server via a communication network 190 through a wireless connection 194. For instance, the communication network 190 may be a cellular network. The mobile device 140 may be provided with various features allowing the vehicle occupants/users to interface with the mobile device 140. For example, the mobile device 140 may receive input from human-machine interface (HMI) controls 152 configured to provide for occupant interaction with the mobile device 140 as well as the vehicle 102.

The computing platform 104 may be further configured to communicate with various electronic control units (ECUs) via one or more in-vehicle network 170. The in-vehicle network 170 may include, but is not limited to, one or more of a controller area network (CAN), an Ethernet network, and a media oriented system transport (MOST), as some examples.

The vehicle 102 may include multiple ECUs configured to control and operate various functions of the vehicle 102. For instance, the computing platform 104 may be in communication with a telematics control unit 174 configured to control telecommunications of the vehicle 102. In many cases, the TCU 174 may be provided is a modem 176 configured to modulate and demodulate communications between the vehicle 102 and a server 192 via a wireless network 190. The TCU 174 may be provided with storage capacity to store software (firmware or application) 178 to control the operation of the TCU 174. Additionally or alternatively, the TCU software 178 may be fully or partially stored elsewhere from the local storage of the TCU 174. For instance, the software 178 may be stored in the storage 106 of the computing platform 104 as a part of the vehicle applications 108.

The computing platform 104 may be further configured to communicate with various ECUs 180 to control and operate various functions of the vehicle 102. As a few non-limiting examples, ECUs 180 may include a powertrain control module (PCM) configured to control the powertrain (e.g. engine and/or transmission); a body control module (BCM) configured to control the body operations (e.g. doors and/or windows); and climate controls configured to control the AC and climate system of the vehicle 102. Each ECU may be provided with a local storage to store software 182 configured to control and perform various functions. Additionally or alternatively, the software 182 may be offsite from the ECU local storage and stored elsewhere such as the storage 106 of the computing platform 104 as a part of vehicle application 108. In another example, it is possible to store the ECU software 182 in the mobile device 140 as a part of mobile application 144.

The computing platform 104 may be configured to perform an over the air (OTA) update to the ECU software 182 stored both locally or offsite. Software update data may be downloaded from the remote server 192 through the wireless network 190 using the TCU 174 and communicated to the relevant storage. Additionally or alternatively, the mobile device 140 may be also be utilized to download ECU update data. End-to-end on-the-fly compression technology may be used at both the server 192 and the computing platform 104 to facilitate the download.

Figure 2:
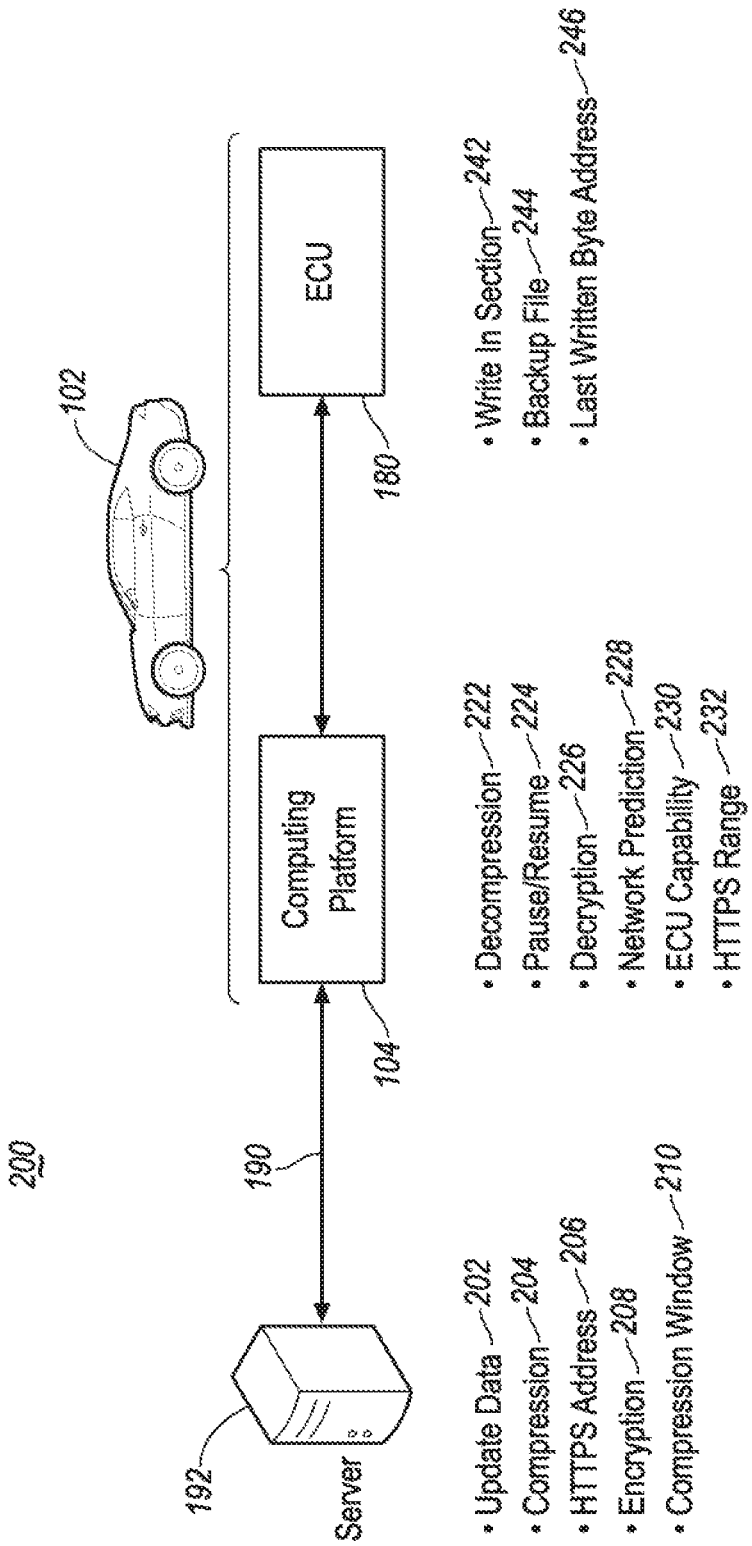
FIG. 2 illustrates an example block diagram of the vehicle system of one embodiment of the present disclosure.

Referring to FIG. 2, a topology system diagram 200 of one embodiment of the present disclosure is illustrated. With continuing reference to FIG. 1, the computing platform 104 is in communication with the server 192 via a wireless network 190 to perform OTA software update to the target ECU 180. Update software data 202 may be stored in the server 192. Specific update data 202 may correspond to a specific hyper text transfer protocol secure (HTTPS) address 206 associated with the server 192. During the update, the computing platform 104 may download update data 202 from the server via the TCU 174 and transmit the update data 202 to the target ECU 180. The computing platform 104 may be configured to calculate the HTTPS address range 232 to download according to update capability 220 of the target ECU 180. For instance, the computing platform 104 may calculate the HTTPS address range 232 to download from the server 192 at a certain time based on RAM configuration, processing power, and/or pipelining configuration of the target ECU 180. The computing platform 104 may further use predicted wireless network coverage/speed 228 to calculate the HTTPS address range 232. The network coverage/speed 228 may be obtained using vehicle location from the GPS controller 126 and a planned route by the navigation controller 128 predicting the vehicle 102 to be at a specific location at a specific time during the update download, combined with network coverage data downloaded from the server 192 or stored in the storage 106 as a part of the map data.

The server 192 may be configured to support the target ECU compression method and compress 204 the update data 202 before sending to the vehicle 102. Responsive to receiving the compressed update data, the computing platform 104 may perform decompression 222 on the data before writing/flashing into the target ECU 180. Additionally, the server 192 may support encryptions 208 for the update data 202 for security purposes. The computing platform 104 may perform decryption 226 on the received data before sending to ECU 180 for writing. Alternatively, the decompression 222 and decryption 226 may be performed at the target ECU 180.

The target ECU 180 may be configured to receive update data 202 from the computing platform 104 and write to the local storage 182 by sections while more update data 202 is being or to be downloaded. In other words, the ECU 180 may start to write the update data 202 into the local storage 184 without first finishing to download all required update data 202. A backup software file 244 may be provided or created for the target ECU 180 to restore in case the update fails. The computing platform 104 may be configured to enable pause and resume 224 the update process when needed. For every section of to be written, the computing platform 104 may be configured to resume from the last-successfully-written byte address 246 from the target ECU 180. In addition, the computing platform 104 calculates a new HTTPS address range 232 based on address written from the target ECU 180 and send to the server 192. Responsive to receiving the new HTTPS address range 232, the server 192 may move the compression window to the new address received in the HTTPS range 232.

Figure 3:
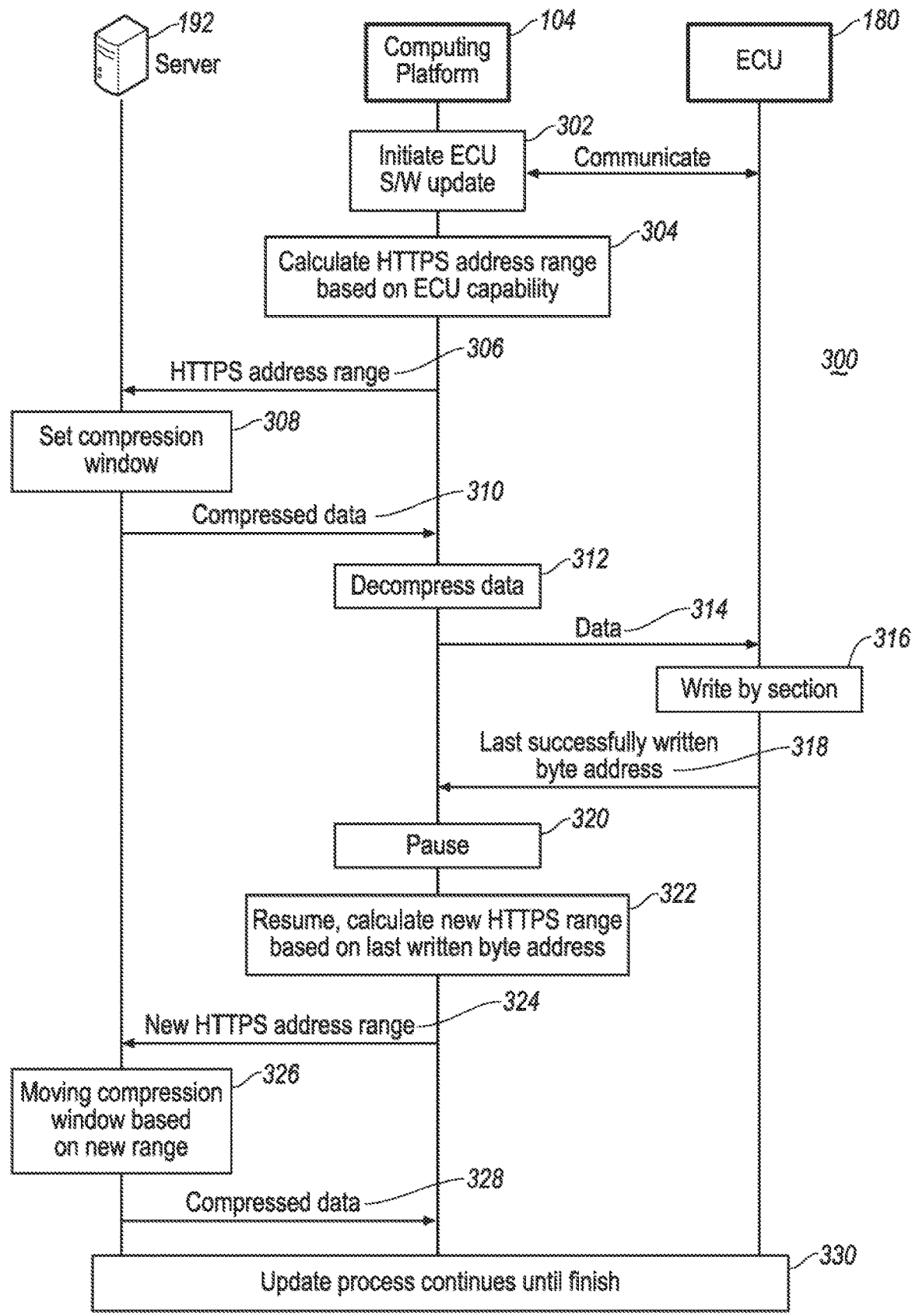
FIG. 3 illustrates a data flow diagram of the vehicle system of one embodiment of the present disclosure.

Referring to FIG. 3, a system data flow diagram 300 for the ECU update process is illustrated. At operation 302, the computing platform 104 initiates ECU software update after communicating with the target ECU 180. The initiation 302 may be triggered by various factors. For instance, the computing platform 104 may receive a message (e.g. push message) from the server 192 indicative of new software is available for the target ECU 180. Alternatively, the initiation operation 320 may be manually triggered by the vehicle user through HMI controls 118 such as by inputting to the touch screen 116 or making a voice command through the microphone 124.

Responsive to the update initiation 302, at operation 304, the computing platform 104 calculates the HTTPS address range 232 for the server 192 based on the target ECU capability 230. As discussed above, the target ECU capability may include processing power, RAM, pipeline and other configurations of the target ECU 180. Additionally, the computing platform 104 may further use predicted wireless network condition 228 to calculate the HTTPS address range 232 associated with the server 192.

At operation 306, the computing platform 104 sends the calculated HTTPS address range 232 to the server 192. In response, the server 192 sets a compression window 210 according to the HTTPS address range 232 received from the computing platform 104 at operation 308 and starts to compress the update data 202 for the target ECU 180. At operation 310, the server 192 sends the compressed update data to the computing platform 104 which decompresses the data at operation 312 in response and send to the target ECU 180. As an example, the computing platform 104 may perform the decompression on-the-fly and send to the target ECU 180 without having a complete file. Alternatively, the computing platform 104 may download all compressed file from the server 192 and decompress on-the-fly. In this case, the computing platform may only have the compressed file and the target ECU 180 receive the decompressed file. Alternatively, the decompression operation may fully or partially be performed at the target ECU 180 depending on the specific a configuration. To further enhance security, the compressed data from the server 192 may be encrypted, and the computing platform 104 may further perform decryption on the received data. Upon successfully decompression (and possible decryption), the computing platform 104 sends the update software data to the target ECU 180 for writing/flashing at operation 314. At operation 316, the target ECU 180 writes the update data into the local storage 182 by each section while more update data is still being download from the server 192 to the computing platform 104. To inform the computing platform 104 about the update status, the target ECU 180 sends the latest successfully written byte address 246 on the local storage 182 to the computing platform 104.

Due to various reasons, the update process may be paused by the computing platform 104 at operation 320. For instance, the computing platform 104 may pause the update download due to a temporary unavailability of wireless network 190. Other reasons for pausing may include encountering tasks with higher priority, user manual input, signal from the target ECU 180 instructing to pause, and etc. Responsive to a resume signal, the computing platform 104 calculates a new HTTPS address range 232 based on the last-successfully-written address 246 received from the target ECU 180 at operation 322 and send the new calculated HTTPS address range 232 to the server 192. Responsive to the new HTTPS address range 232 received from the computing platform 104, the server 192 moves the compression window according to the new range at operation 326 and continues to compress and send the compressed data 328 to the computing platform 104. The update process continues until it finishes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle comprising:
   a processor, programmed to
      responsive to receiving, via a user interface, user input indicative of a navigation destination, calculate, via a navigation controller, a navigation route from a current location of the vehicle to the navigation destination;
      predict a wireless network download speed for the vehicle at a location on the navigation route using network coverage data downloaded from a first server;
      calculate an address range to download update data using the wireless network download speed at the location on the navigation route;
      send the address range to a second server where the update data is stored base on an updating capability of an Electronic Control Unit (ECU);
      responsive to receiving update data from the second server, perform an update by writing the update data into the ECU eligible for the update data; and
      responsive to receiving a resume signal to resume the update from a paused state, send a new address range to the second server based on a last-written address received from the ECU.

2. The system of claim 1, wherein the address range of update data further corresponds to capability of the ECU, to perform the update, the capability of the ECU including at least one of: processing configuration, random access memory (RAM) configuration, and pipelining configuration.

3. The system of claim 1, wherein the processor is further programmed to:
   receive a written byte address from the ECU, and resume from the last written byte address from the ECU.

4. The system of claim 1, wherein the processor is further programmed to perform on-the-fly decompression on the update data received from the second server.

5. The system of claim 1, wherein the processor is further programmed to perform decryption on the update data received from the second server.

6. The system of claim 1, wherein the processor is further programmed to trigger the ECU to restore to a backup file.

7. The system of claim 1, wherein the address range is a hyper-text transfer protocol secure (HTTPS) address range.

8. A method for a vehicle comprising:
   responsive to receiving, via a user interface, user input indicative of a navigation destination, calculating, via a navigation controller, a navigation route from a current location of the vehicle to the navigation destination;
   downloading, from a server database, a network coverage data;
   predicting a wireless network download speed for the vehicle at a location on the navigation the navigation route using network coverage data;
   calculating a Hyper Text Transfer Protocol Secure (HTTPS) address range to download update data using the wireless network download speed at the location on the navigation route;
   sending the HTTPS address range to a server based on an update capability of an Electronic Control Unit;
   receiving the update data from the server;
   writing update data to the ECU in sections;
   revising the HTTPS address range using a last-written address of a section from the ECU; and
   resuming to write update at the last-written byte address.

9. The method of claim 8, wherein the HTTP address range of update data further corresponds to capability of a controller to perform the update, the capability of the controller including at least one of: processing configuration, RAM configuration, and pipelining configuration.

10. The method of claim 8, wherein the update data is compressed using on-the-fly compression technology.

11. The method of claim 8, further comprising:
    decrypting the compressed data received from the server.

* * * * *